(12) United States Patent
St-Laurent

(10) Patent No.: US 10,999,190 B2
(45) Date of Patent: *May 4, 2021

(54) SYSTEM AND METHOD FOR TIMELY AND UNIFORM DISTRIBUTION FOR REAL-TIME PACKET TRANSMISSION

(71) Applicant: GRASS VALLEY CANADA, Montreal (CA)

(72) Inventor: Frederick St-Laurent, Laval (CA)

(73) Assignee: GRASS VALLEY CANADA, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,682

(22) Filed: Jan. 8, 2020

(65) Prior Publication Data
US 2020/0145329 A1    May 7, 2020

Related U.S. Application Data

(63) Continuation of application No. 15/938,602, filed on Mar. 28, 2018, now Pat. No. 10,560,373.
(Continued)

(51) Int. Cl.
*H04L 12/725* (2013.01)
*G06F 9/54* (2006.01)
(Continued)

(52) U.S. Cl.
CPC .......... *H04L 45/3065* (2013.01); *G06F 9/544* (2013.01); *G06F 9/545* (2013.01);
(Continued)

(58) Field of Classification Search
None
See application file for complete search history.

(56) References Cited

U.S. PATENT DOCUMENTS 5,548,731 A * 8/1996 Chang .................... H04L 29/06
703/25
5,778,180 A * 7/1998 Gentry .................. G06F 13/128
709/212
(Continued)

FOREIGN PATENT DOCUMENTS

EP    2632109 A2    8/2013

OTHER PUBLICATIONS

International Search Report and Written Opinion dated Jul. 19, 2018, regarding PCT/EP2018/058497.

*Primary Examiner* — Lashonda T Jacobs
(74) *Attorney, Agent, or Firm* — Arent Fox LLP

(57) ABSTRACT

A system and method is provided for timely and uniform real-time data packet transmission by a computing device. The system can include a shared packet memory buffer for storing data packets generated by a user application and a shared schedule memory buffer for storing packet identifiers and corresponding time slots for the data packets. Moreover, a kernel module is provided that operates in the kernel mode of the operating system directly above the network interface controller and can continuously poll the shared scheduled memory to access packet identifiers at corresponding time slots. Based on the packet identifiers in each time slot, the kernel module can pull the data packet having the packet identifier directly from the ring buffer and send each packet to the network interface controller for transmission as part of a media stream over a network to a media consuming device.

20 Claims, 11 Drawing Sheets

Related U.S. Application Data

(60) Provisional application No. 62/482,601, filed on Apr. 6, 2017.

(51) Int. Cl.
*H04L 29/08* (2006.01)
*H04L 29/06* (2006.01)
*H04L 12/26* (2006.01)
*H04L 12/771* (2013.01)
*H04L 12/801* (2013.01)
*H04L 12/863* (2013.01)

(52) U.S. Cl.
CPC .............. *H04L 43/10* (2013.01); *H04L 45/56* (2013.01); *H04L 47/34* (2013.01); *H04L 47/50* (2013.01); *H04L 67/32* (2013.01); *H04L 69/16* (2013.01); *H04L 69/321* (2013.01); *H04L 69/322* (2013.01); *H04L 69/329* (2013.01)

(56) References Cited

U.S. PATENT DOCUMENTS

| | | | | |
|---|---|---|---|---|
| 5,815,689 | A * | 9/1998 | Shaw | G06F 16/40 713/400 |
| 6,347,337 | B1 * | 2/2002 | Shah, V | H04L 47/10 709/224 |
| 6,697,870 | B1 * | 2/2004 | Cafarelli, III | H04L 43/18 709/224 |
| 6,735,629 | B1 * | 5/2004 | Cafarelli, III | H04L 43/12 709/223 |
| 6,798,743 | B1 * | 9/2004 | Ma | H04L 47/10 370/235 |
| 7,024,672 | B2 * | 4/2006 | Callender | G06F 21/53 713/1 |
| 7,178,018 | B2 | 2/2007 | Morris et al. | |
| 7,248,584 | B2 * | 7/2007 | Hooper | H04L 29/06 370/392 |
| 7,457,282 | B2 * | 11/2008 | Mallila | H04J 3/0632 370/352 |
| 7,457,635 | B2 | 11/2008 | Song et al. | |
| 7,486,680 | B1 * | 2/2009 | Zhang | H04N 21/23406 370/395.4 |
| 8,121,148 | B2 | 2/2012 | Olderdissen | |
| 8,744,246 | B2 * | 6/2014 | Dufosse | G06Q 10/06311 386/326 |
| 9,240,953 | B2 | 1/2016 | Carlstrom | |
| 9,892,482 | B2 * | 2/2018 | You | G06F 9/3881 |
| 10,176,106 | B2 * | 1/2019 | Aronovich | G06F 9/455 |
| 10,235,298 | B2 | 3/2019 | Wang | G06F 12/1063 |
| 2003/0081601 | A1 * | 5/2003 | Morris | H04L 67/34 370/389 |
| 2003/0139178 | A1 * | 7/2003 | Uesugi | H04L 49/901 455/422.1 |
| 2005/0102578 | A1 * | 5/2005 | Bliss | G06F 11/3476 714/38.11 |
| 2007/0239890 | A1 * | 10/2007 | Chen | G06F 9/505 709/238 |
| 2008/0320297 | A1 * | 12/2008 | Sabo | H04L 9/0825 713/152 |
| 2009/0034549 | A1 * | 2/2009 | Soni | H04L 49/90 370/412 |
| 2009/0204978 | A1 * | 8/2009 | Lee | G06F 9/545 719/321 |
| 2009/0296685 | A1 * | 12/2009 | O'Shea | H04L 69/32 370/351 |
| 2011/0167434 | A1 * | 7/2011 | Gaist | G06F 9/545 719/320 |
| 2012/0039332 | A1 * | 2/2012 | Jackowski | H04L 47/2441 370/389 |
| 2013/0077486 | A1 | 3/2013 | Keith | |
| 2014/0130060 | A1 | 5/2014 | Pope et al. | |
| 2016/0210159 | A1 * | 7/2016 | Wilson | G06F 9/4411 |
| 2016/0378545 | A1 * | 12/2016 | Ho | G06F 9/46 718/107 |
| 2018/0054761 | A1 * | 2/2018 | Pathak | H04L 41/5032 |

\* cited by examiner

SYSTEM AND METHOD FOR TIMELY AND UNIFORM DISTRIBUTION FOR REAL-TIME PACKET TRANSMISSION

CROSS REFERENCE TO RELATED APPLICATIONS

This application is a continuation application of U.S. patent application Ser. No. 15/938,602, filed Mar. 28, 2018, and now issued as U.S. Pat. No. 10,560,373 on Feb. 11, 2020, and which claims priority to U.S. Patent Provisional Application No. 62/482,601, filed Apr. 6, 2017, the entire contents of each of which are hereby incorporated in their entirety.

TECHNICAL FIELD

The disclosure generally relates to data transmission, and, more particularly, to a system and method for timely and uniform distribution real-time data packet transmission over a network.

BACKGROUND

As media production migrates to packet-based data infrastructures, personal computer (PC) based software must be able to transmit high bitrate streams of data over a network to transport uncompressed video and audio data. Moreover, because many of the devices consuming these data streams perform minimal data buffering, senders in the network should try to space the transmitted data packets as evenly as possible to achieve a constant flow of packets instead of a burst for each frame or field in order to minimize data buffering requirements by the media consuming devices.

Moreover, in recent years, the Society of Motion Picture and Television Engineers® (SMPTE®) has standardized the use of IEEE 1588 precision time protocol ("PTP") to provide time-aligned signal generation and permit the interoperable use of IP-based media equipment with conventional genlocked serial digital interface ("SDI") equipment. These standards, and, in particular, SMPTE ST 2059-1, require that frames should to be sent at exactly the same time by all devices. As a result, it is even more critical that transmitting devices avoid transmission delays and packet bursts.

Modern non-realtime PC operating system (such as Windows® and most versions of Linux®, for example) provide little control on when certain operations will be executed, including, for example, when network data packets will be sent. As a result, it is nearly impossible for devices running on these operating systems to evenly space the transmission of such data packets. In particular, each individual data packet that is sent by a user mode application running on one of these existing operating systems will have to transition between the user mode and kernel mode, which inevitably leads to the delay of transmitting data packets.

FIG. 1 illustrates a conventional operating system network model. As shown, the operating system transitions between two distinct modes: user mode 10 and kernel mode 20. In user mode 10, the executing applications (e.g., applications 12A, 12B and 12C) have limited access to the computer hardware or reference memory, but cannot access the NIC hardware or NIC memory and must delegate this access to the system application programming interfaces ("APIs"). In contrast, in kernel mode 20, the executing code has complete and unrestricted access to the underlying hardware (including the NIC) and can execute any CPU instruction and reference any memory address. Accordingly, when a user mode application (e.g., application 12A) needs to transmit a data packet, the data packet must transition through multiple layers (e.g., network layers 22A, 22B . . . 22N) of the network stack of the kernel mode 20, which might include a firewall, anti-virus layers and the like, before reaching the driver 24 of the network interface controller ("NIC"), which ultimately transmits the data packet. As such, each of these steps to transmit every data packet requires time that cause problems when try to send for high bit rate/packet rate since every operation must be performed on the same thread to guarantee the packet order is kept during transmission.

Moreover, the ever improving video standards and resolution capabilities of media consuming devices only further increases the requirements for bit rate and packet rate. For example, current video standards and resolution can reach up to 1 million packets per second for a single stream at 12 Gbps (e.g., for a SMPTE ST 2022-6 ultra-high definition ("UHD") stream), meaning that a packet has to be sent every about microsecond (p).

Accordingly, a system and method is desired for timely and uniform distribution real-time data packet transmission of a network.

SUMMARY

A system and method is provided for timely and uniform real-time data packet transmission by a computing device. The system can include a ring buffer for storing data packets generated by a user application and a shared schedule memory buffer for storing packet identifiers and corresponding time slots for the data packets. Moreover, a kernel module is provided that operates in the kernel mode of the operating system directly above the network interface controller and can continuously poll the shared scheduled memory to access packet identifiers at corresponding time slots. Based on the packet identifiers, the kernel module can pull the data packets directly from the ring buffer and send them to the network interface controller for transmission as part of a media stream over a network to a media consuming device.

In one particular aspect, the system includes network interface controller configured to transmit data packets over a network; a first shared memory buffer; and a second shared memory that includes an array for a plurality of time slots for the data packet transmission. Moreover, the kernel module is operating in a kernel mode of an operating system of the computing device and is configured to generate a packet group. Furthermore, one or more software application are operating in a user mode of the operating system of the computing device, and each can be configured to generate at least one data packet; access a free packet of the packet group; fill the free packet with the at least one data packet; and schedule a transmission time of the at least one data packet by storing a packet identifier associated with the at least one data packet in one of the plurality of time slots in the array of the second shared memory buffer. In addition, the kernel module is further configured to poll the second shared memory to access the packet identifier at each corresponding time slot and obtain, if available, a data packet having the packet identifier from the ring buffer to be transmitted by the network interface controller.

In another exemplary aspect, a system is provided for timely and uniform real-time data packet transmission by a computing device according to another embodiment. In this aspect, the system includes a network interface controller configured to transmit data packets over a network; a first shared memory buffer configured to store a plurality of data packets to be transmitted over the network; a second shared memory buffer that includes an array configured to store a plurality of time slots for the data packet transmission; and a kernel module operating in a kernel mode of an operating system of the computing device and configured to generate at least one packet group for the first shared memory buffer. Moreover, the system includes at least one software application operating in a user mode of the operating system of the computing device, the at least one software application configured to generate a plurality of data packets; access a free packet of the at least one packet group in the first shared memory buffer; fill the free packet with a payload of one of the plurality of data packets; and schedule a transmission time of the one data packet by storing a packet identifier associated with the one data packet in one of the plurality of time slots in the array of the second shared memory buffer. According to the exemplary system, the kernel module is further configured to poll the second shared memory buffer to access the packet identifier and corresponding time slot and access the one data packet of the plurality of data packets from the first shared memory buffer. Moreover, the kernel module is coupled to a driver of the network interface controller and configured to control the driver to transmit the accessed one data packet via the network interface controller over the network based on the corresponding time slot in the second shared memory buffer.

According to a refinement of the exemplary aspect, the kernel module is further configured to bypass a network stack in the kernel mode of the operating system to directly access the plurality of data packets from the first shared memory buffer for the timely and uniform real-time data packet transmission of the accessed one data packet without the accessed one data packet transitioning through the network stack.

According to another refinement of the exemplary aspect, the kernel module is further to execute a thread for sending the plurality of data packets stored in the first shared memory buffer by polling the second shared memory buffer to access the stored plurality of time slots and corresponding packet identifier for the plurality of data packets.

According to another refinement of the exemplary aspect, the system further includes a plurality of software applications operating in the user mode of the operating system with each of the plurality of software applications coupled to a separate first shared memory buffer that stores a plurality of data packets for the respective software application to be transmitted over the network. In this aspect, the kernel module is further to execute a pair of threads for sending the plurality of data packets for each of the respective software applications, wherein each of the pair of threads alternates between a sending state for sending at least one data packet and a sleeping state. Moreover, each thread can be configured to transition from the sending state to the sleeping state upon determining that the other thread has transitioned from the sleeping state to the sending state, such that the kernel module is configured to circumvent at least one operational limit required by the operating system of the computing device to prevent continuous thread execution by a processor of the computing device.

According to another refinement of the exemplary aspect, the system further includes a plurality of second shared memory buffers that are each coupled to one of the plurality of software applications, respectively, and that each store a plurality of time slots for data packet transmission of each of the plurality of data packets for the respective software application to be transmitted over the network.

Moreover, in on exemplary aspect, the at least one software application is further configured to generate the packet identifier for each of the plurality of data packets based on a packet group number of the at least one packet group created by the kernel module and a packet index number of the respective data packet.

According to another refinement of the exemplary aspect, the kernel module is further configured to send a packet list to the driver of the network interface controller that includes two or more data packets of the plurality of data packets when the kernel module determines that at least one data packet of the two more data packets included in the packet list is late on schedule according to the corresponding time slot in the second shared memory buffer.

According to a further refinement of the exemplary aspect, the kernel module is further configured to add the accessed one data packet to the first shared memory buffer, such that the at least one software application knows that the accessed one data packet was sent by the network interface controller and that one or more additional data packets of the plurality of data packets can be stored in place of the one data packet.

In another exemplary aspect, a system is provided for timely and uniform real-time data packet transmission by a computing device, in which the system includes a first shared memory buffer configured to store a plurality of data packets generated by at least one software application operating in a user mode of an operating system of the computing device; and a second shared memory buffer that includes an array configured to store a plurality of time slots for the data packet transmission. In this aspect, the system further includes a kernel module operating in a kernel mode of the operating system of the computing device, the kernel model including a packet group generator configured to generate at least one packet group for the first shared memory buffer, a data packet transmission scheduler configured to poll the second shared memory buffer to access a plurality of packet identifiers associated with the plurality of data packets generated by the at least one software application, the plurality of packet identifiers being associated with the plurality of time slots for the data packet transmission, respectively, a data packet accessor configured to access each of the plurality of data packets from the first shared memory buffer based on the respective packet identifier and corresponding time slot, and a data packet transmission controller coupled to a driver of a network interface controller and configured to control the driver to transmit each of the plurality of data packets via the network interface controller over the network based on the corresponding time slot.

In another exemplary aspect, a system is provided for timely real-time data packet transmission by a computing device, where the system includes a first shared memory buffer configured to store a plurality of data packets generated by at least one software application operating in a user mode of an operating system of the computing device; and a data packet transmission controller operating in a kernel mode of the operating system of the computing device and configured to directly access the plurality of data packets from the first shared memory buffer for the timely real-time data packet transmission of the plurality of data packets by bypassing a transition through a network stack in the kernel mode of the operating system before network transmission.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplary pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
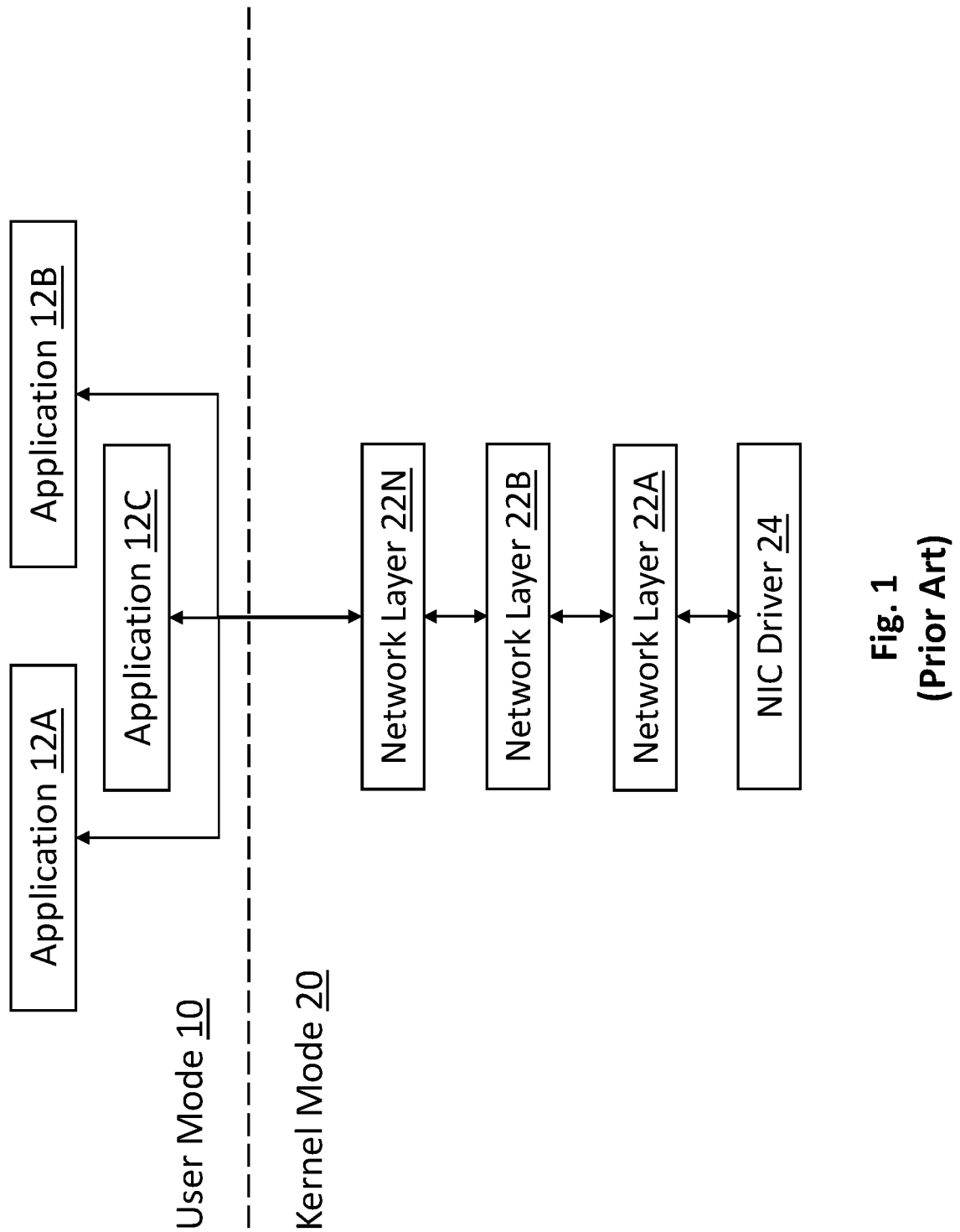
FIG. 1 illustrates a conventional operating system network model.

Various aspects of the disclosed system and method are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the invention in order to provide a basic understanding thereof.

Figure 2:
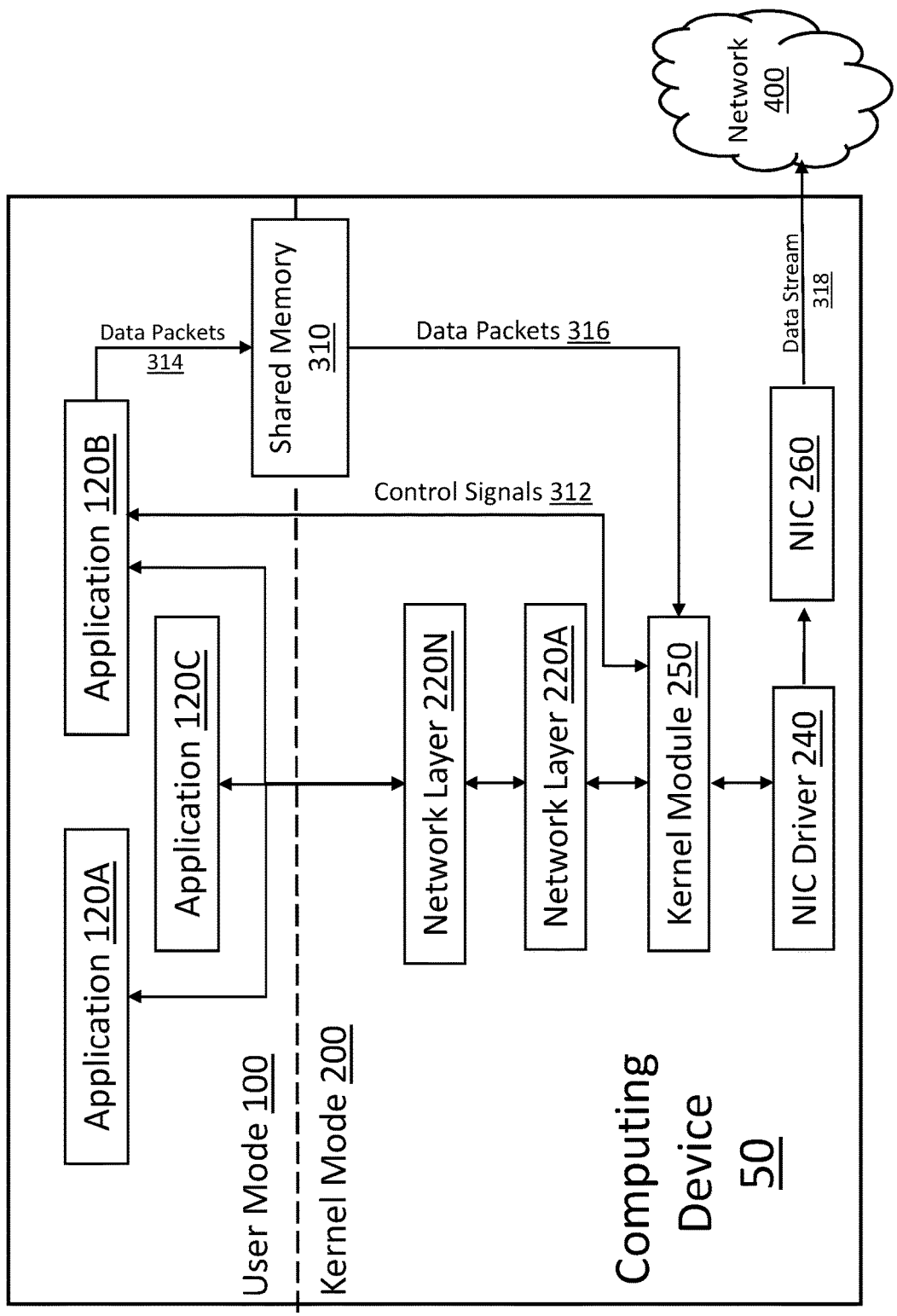
FIG. 2 illustrates a block diagram of a system for timely and uniform distribution real-time data packet transmission according to an exemplary aspect.

FIG. 2 illustrates a block diagram of a system for timely and uniform distribution real-time data packet transmission according to an exemplary aspect. In general, an operating system ("OS") network model with a kernel module is provided for managing the data packet transmission. In particular, it is contemplated that the exemplary system can be implemented on any type of computing device 50 (e.g., a personal computer, laptop, server, etc.) that includes one or a plurality of software applications 120A, 120B and 120C (e.g., user mode applications), that include functionality for generating data packets (e.g., forming media streams) to be transmitted over a network, such as network 400, and ultimately to media consuming devices. It is noted that the number of applications is not particularly limited and that the disclosed system can work with a single application.

In general, the term "data packet", also referred to as a network packet, is well known to those skilled in the art and is a formatted unit of data that can be transmitted over a packet-switched network. Each data packet includes control information found in the packet headers and trailers that identifies, for example, source and destination network addresses, error detection codes, sequencing information, and the like. Moreover, each data packet also includes the user data or payload, which in the case of media streams includes the audio and video data, for example.

Typically, the processing to assemble packets, including the specifying of certain control information, is performed by the network stack of the computing device. However, according to the exemplary aspect, this packet processing is now performed by the respective user mode application (e.g., application 120B). For example, if user mode application 120B is designed to send UDP ("user data protocol")/IP ("Internet protocol") packets over Ethernet, application 120B will be configured to handcraft the packet starting by adding the Ethernet headers followed by IP and UDP headers and then finally putting the actual payload in the data packet that it wants to send. These data packets 314 are shown as being generated by application 120B and sent to shared memory 310 (i.e., a first shared memory buffer), which will be described in more detail below. By formatting the data packets 314 by application 120B (or any user mode application), the data packet transmission system implemented on computing device 50 enables precise and quick crafting of the packet to send as the code, which can be tailored to the functional requirements of the user mode application 120B.

As further shown, the computing device 50 has two modes: user mode 100 and kernel mode 200. The distinction between these two modes is understood to those skilled in the art and described above. Each of applications 120A, 120B and 120C is a user mode application. Moreover, kernel mode 200 includes the network stack, shown to include network layer 220A to 220N and can be any number of layers. It is noted that each of applications 120A, 120B and 120C is shown to be communicatively coupled (optionally) to the first network layer N in the network stack, and, therefore, each application can use all of these standard tools provided by the operating system of the computing device 50 to access the same network interface controller (i.e., the NIC software driver 240 is shown). Advantageously, this configuration provides for performing occasional network access, such as resolving Internet Protocol version 4 (IPv4) addresses to Ethernet addresses using Address Resolution Protocol ("ARP") that is normally built into the OS and can be reused for maximum reliability and interoperability.

In any event, according to the exemplary aspect, a kernel module 250 is an application in the kernel mode 200 that facilitates the timely and uniform transmission of data packets generated by one or more of the user mode applications (shown as application 120B) according to the exemplary aspect. As will be described in detail below, the kernel module 250, which can also be considered a data packet transmission controller, is configured to execute a number of functions for performing the data packet transmission protocols described herein. In one aspect, the kernel module 250 can include multiple components/modules configured to execute the exemplary protocols. For example, a packet group generator can be included that generates packet groups to be stored in the first shared memory buffer and a data packet transmission scheduler can be provided to poll a second shared memory buffer to access a plurality of packet identifiers associated with the plurality of data packets generated by user mode one software application, with the plurality of packet identifiers being associated with the plurality of time slots for the data packet transmission, respectively. Moreover, the kernel module 250 can include a data packet accessor that can directly access each of the plurality of data packets from the first shared memory buffer based on the respective packet identifier and corresponding time slot, and a data packet transmission controller coupled to a driver of a network interface controller that can transmit control signals to the driver to control transmission of each of the plurality of data packets via the network interface controller over the network based on the corresponding time slot. The exemplary algorithms and protocols will be described in detail below generally with respect to the kernel module 250.

Figure 9:
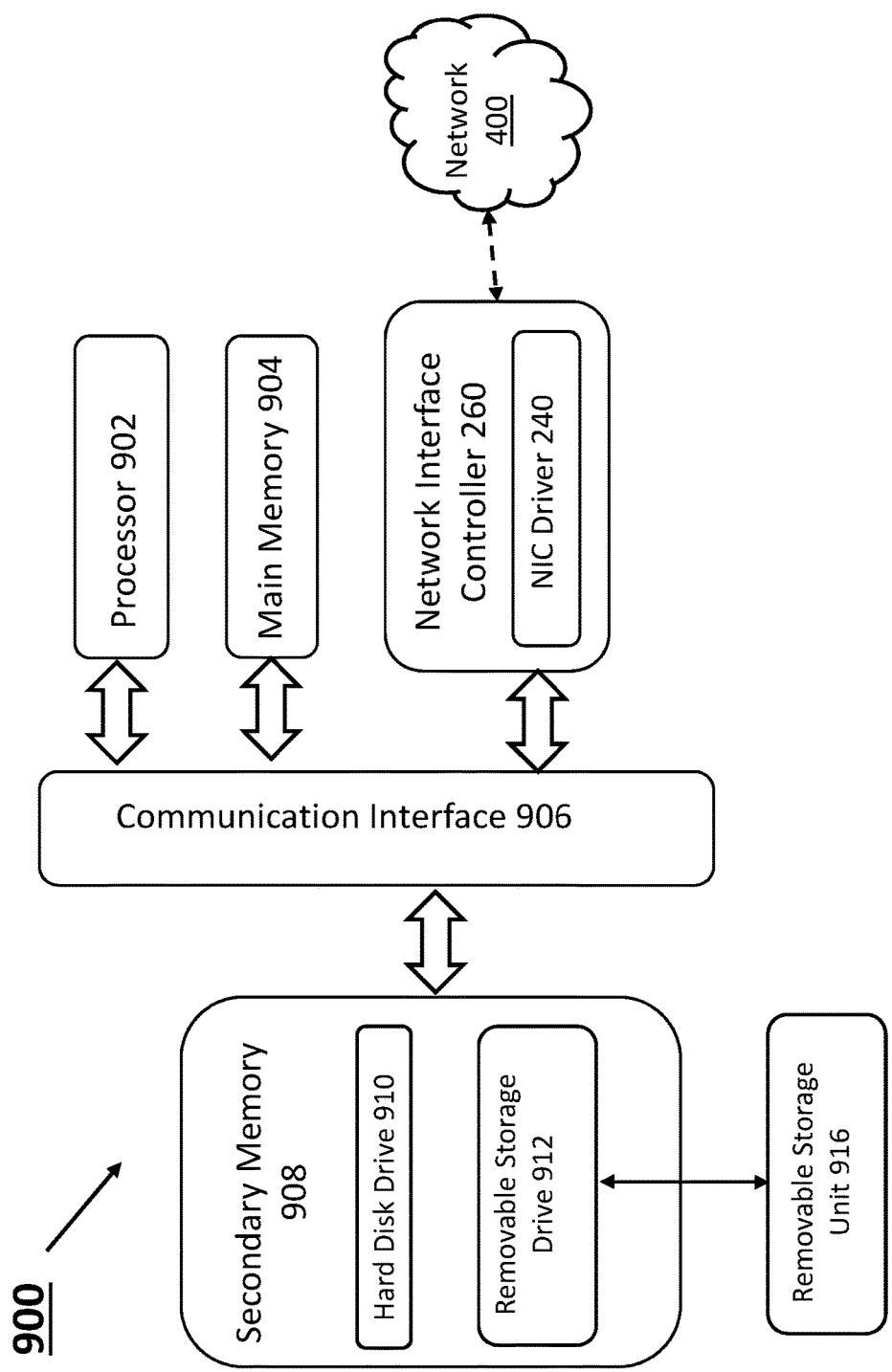
FIG. 9 illustrates a high-level block diagram of a system for timely and uniform distribution real-time data packet transmission according to an exemplary aspect.

Moreover, it is noted that as used herein, the term "module" generally refers to a software service or application executed by a processor of a computer, such as computing device 50, that can include an arrangement of components implemented using hardware, such as by an application specific integrated circuit ("ASIC") or field-programmable gate array ("FPGA"), for example. Moreover, a "module" may be a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In general, each module can be realized in a variety of suitable configurations, and should not be limited to any example implementation exemplified herein. It is further noted that examples of details of the hardware components of computing device 50 as shown in FIG. 9 and described below.

As further shown in FIG. 2, the computing device 50 includes shared memory 310 (i.e., a memory buffer) that is accessible by both the user mode application (e.g., application 120B) and the kernel module 250. Preferably, the shared memory 310 can be a ring buffer, for example, which in its simplest form is a data structure that uses a single, fixed-size buffer as if it were connected end-to-end. A ring buffer is useful as shared memory 310 as it does not need to have its elements shuffled around when data is consumed, and, therefore, is well-suited as a FIFO ("first in, first out") buffer. In this aspect, the user mode application 120B is configured to write data packets 314 to shared memory 310, and, in turn, kernel module 250 is configured to access and read these data packets (shown as data packets 316, but are the same data packets). Moreover, once the ring buffer is full, a subsequent write by user mode application 120B will overwriting the oldest data packet and so forth, which presumably has already been accessed by kernel module 250 and transmitted over the network 400 by NIC driver 240 (and the underlying NIC hardware 260), as will be described in more detail below.

According to the exemplary aspect, the disclosed system is capable of achieving close to an ideal packet distribution (i.e., an average of below 1 μs delta) with minimal outliers to this ideal distribution while minimizing the processing usage of the computing device 50 compared to existing approaches that require using the standard networking layer (e.g., network layers 220A to 220N) of the operating system of such a device. Since the kernel module 250 works on top of the NIC driver 240, the kernel module 250 will work with any hardware including in virtualized environments. However, it should be appreciated that quality of packet distribution in virtualized environments will depend on the scheduling performed by the hypervisor (i.e., the virtual machine monitor), but will still be permissible within the context of the disclosed system and method, assuming constant execution of the guest operating system with constant CPU assignment of the host device.

It is further noted that while the exemplary aspect is described to facilitate data packet transmission for user mode applications generating video streams sent over the network 400, the disclosed system and method can be used for any type of application that requires data packets to be sent at a precise time (as opposed to as soon as possible). Moreover, it should be understood that the network 400 is any type of applicable network for communicating data packets and data operations and can include a communication system (not shown) that connects the various devices by wire, cable, fiber optic, and/or wireless links facilitated by various types of well-known network elements, such as hubs, switches, routers, and the like. It should be appreciated that the network 400 may employ various well-known protocols to communicate information amongst the network resources. In one aspect, the network 400 can be part of the Internet as would be understood to one skilled in the art.

As shown in FIG. 2, the kernel module 250 is communicatively coupled to user mode application 120B (and any other applications utilized the disclosed system) and also directly to shared memory 310. The kernel module 250 and user mode application 120B are configured to communicate control signals 312 to each other. For example, each user mode application can ask the kernel module 250 if it is ready to transmit data packets and the kernel module 250 can send a confirmation signal indicating its status in response to this request from the user mode application. As a result, the user mode application 120B can then begin placing data packets 314 in shared memory 310, which the kernel module 250 can then access as data packets 316 to ultimately be transmitted by the NIC 260 to a consuming device over network 400. Moreover, the user mode applications (e.g., application 120B) can generate a control signal to the kernel module 250 to stop transmitting data packets 318 immediately, for example.

Advantageously, by using the kernel module 250, the disclosed system is configured to send packets faster than conventional systems by avoid the standard networking layers (e.g., network layers 220A to 220N) and also improve packet scheduling by sending packets at the right time and minimizing bursts of data packets, as will be described below.

By providing the kernel module 250 above the NIC driver 240, while avoiding the network layers 220A to 220N since it is directly coupled to the shared memory 310 and bypasses network layers 220A to 220N, the computing device 50 can minimize the per-packet processing to achieve higher packet rate with less CPU usage of the computing device 50 while maintaining the ability to use any network interface controller supported by the OS of the computing device 50. In particular, the kernel module 250 is running in kernel mode 200 and is part of the network stack that allows sending data packets without the processing of the traditional network stack (e.g., network layers 220A to 220N) and using the common interface exposed by the lowest level module that is responsible for the NIC specific processing (i.e., the NIC driver 240). Advantageously, this process can be performed without interfering with the other packets sent by the OS or other applications so that the same NIC can also be used for other purposes.

Furthermore, by providing shared memory 310, the disclosed system can avoid the resource-intensive user mode to kernel mode transition (except when the application wants to reserve (or free) the shared memory data structure) that conventional systems must continuously perform to send data packets by allocating the shared memory structure that is accessed by both the user mode application (e.g., application 120B) and the kernel module 250. According to this aspect, access to this shared memory 310 can be synchronized using interlocked memory accesses functions offered by the OS and CPU of the computing device 250 so that the user mode application 120B can simply write data packets 314 to the shared memory 310, and, in parallel, the kernel module 250 can probe the shared memory 310 to access the data packets 316 to be sent by the NIC, as described above. Moreover, using the shared memory 310 to send the data packets also has the advantage that the data packets are never copied or modified after being produced by the user mode application (e.g., application 120B). Thus, the application 120B can produce the data packet in the shared memory 310 and this is the exact memory that will then ultimately be used by the NIC driver 240 to send the data packet to the physical NIC 260 to be transmitted over network 400.

Moreover, according to the exemplary aspect, the kernel module 250 is configured to transmit data packets generated by user mode applications with a regular spacing so that they can be sent at the exact moment they should be sent (according to SMPTE standards and protocols, for example). This precision cannot be achieved in the conventional user mode because of the non-real-time aspect of the operating system. However, configuring the sending thread of the kernel mode 200 of the exemplary system to run in the kernel mode 200 with the highest possible priority made available by the operating system allows the sending thread to avoid getting preempted by other threads on the system.

Figure 3A:
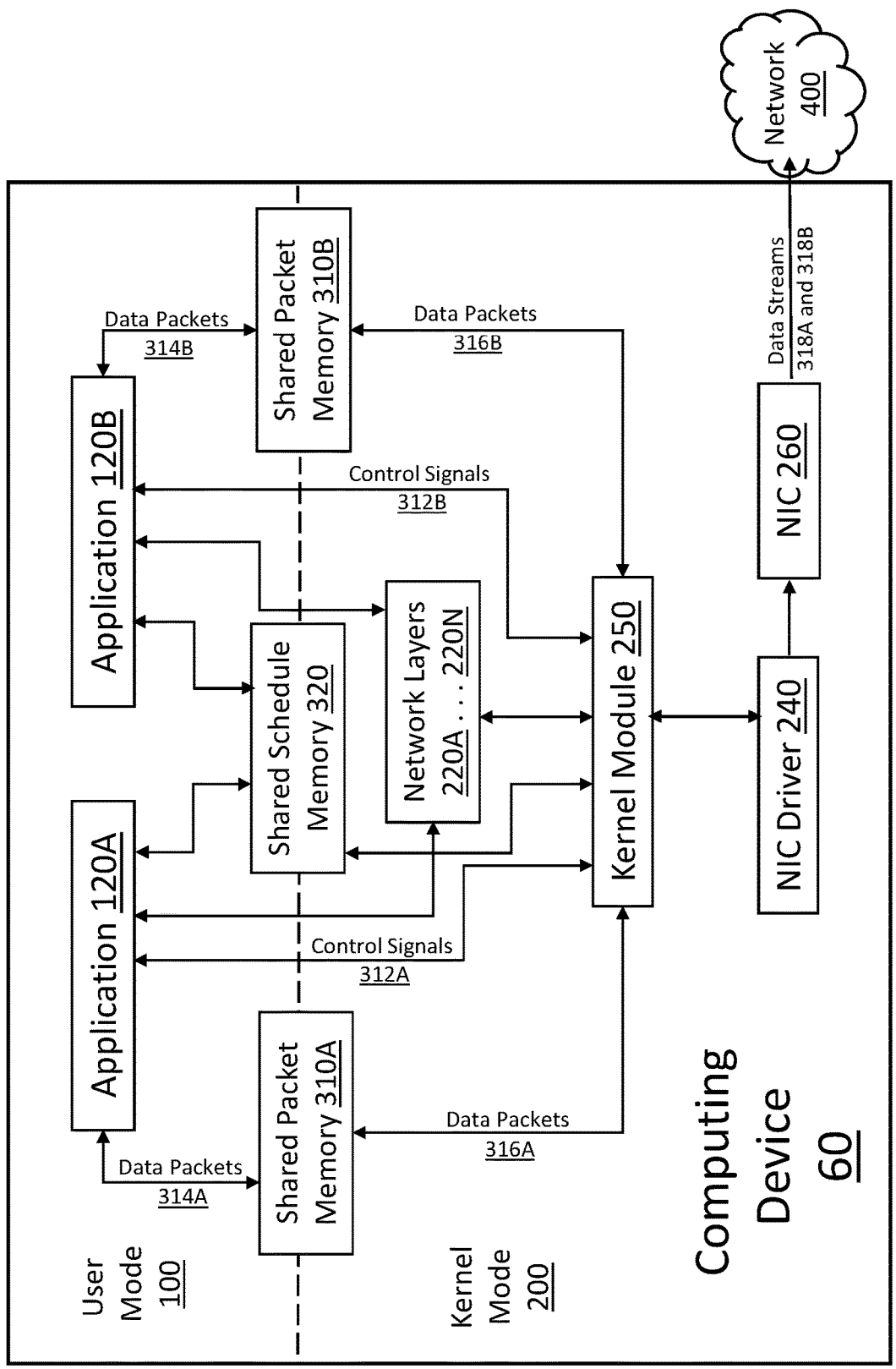
FIG. 3A illustrates a block diagram of a system for timely and uniform distribution real-time data packet transmission according to another exemplary aspect.

FIG. 3A illustrates a block diagram of a system for timely and uniform distribution real-time data packet transmission according to another exemplary aspect. As shown, the computing device 60 includes many of the same components as computing device 50 described above, including kernel module 250. The description and functionality of these components will not be repeated herein, but unless otherwise described, it should be assumed that the same components are configured to perform the same algorithms and functions described above.

The primary distinction in this embodiment is that the sending thread executed by the kernel module 250 is designed to concurrently send media streams for a plurality of user mode applications, which are shown as applications 120A and 120B. Importantly, a single sending thread (or a pair of alternating threads as discussed below) is used to preserve packet ordering and precise timing. According to the exemplary aspect, the sending thread will be automatically started with the first application (e.g., application 120A) using the Kernel module 250 and automatically stopped when the last application (e.g., application 120B) stops using the kernel module 250.

Moreover, user mode application 120A is associated with and communicatively coupled to shared packet memory 310A, while user mode application 120B is associated with and communicatively coupled to shared packet memory 310B. Packet shared memories 310A and 310B (collectively referred to as "first shared memory buffers") can be ring buffers similar to shared memory 310 described above. In this embodiment, user mode application 120A is configured to send a plurality of data packets 314A to shared packet memory 310A and user mode application 120B is configured to send a plurality of data packets 314B to shared packet memory 310B.

As further shown, each of user mode applications 120A and 120B is coupled to shared schedule memory 320 (i.e., a second shared memory buffer). According to the exemplary embodiments, each user mode applications 120A and 120B will fill one or many packet groups for the media stream, such that each packet group will be composed of a plurality of data packets (described above), with the specific number depending on the need of the application (e.g., the overall size of the media stream, etc.). In addition, the kernel module 250 can assign each data packet group a unique identifier for that group, such that every data packet can be uniquely identified by combining the packet group identifier generated by the kernel module 250 with the packet index into that group to form a "packet identifier" for each packet. Because the kernel module 250 creates the packet group identifier, it can provide for faster and easier processing during execution of the sending thread. In general, a packet group is generated by the kernel module 250 (or component thereof such as a packet group generator) and is composed of two parts. The first part is a big buffer subdivided into smaller sections (i.e., a plurality of payload sections), with each section used to store the data (e.g., the payload) of a separate packet. Each of those sections are identified by a packet index number. The second part is the ring buffer that is used by the kernel module 250 to communicate to the user mode application(s) when scheduled packets identifiers (i.e., the combination of group identifier and packet identifier) is completely sent, such that the ring buffer can be used again by the user mode application(s) to send some additional data packets.

The packet identifier enables the kernel module 250 to track and timely transmit each data packet according to the specified schedule. In particular, according to the exemplary aspect, the shared schedule memory 320 can be a simple memory array to store multiple packet identifiers generated and provided by each user mode application 120A and 120B. Thus, each value in the array 320 (i.e., shared schedule memory 320) can represent a time slot in which a data packet can be scheduled (i.e., the array includes a listing of time slots and corresponding packet identifiers from each of user mode applications 120A and 120B). It is noted that the duration of each time slot can vary depending on the OS or the hardware, but the duration should be constant for a given execution (i.e., during a transmission session by kernel module 250) as it directly affects the precision of packet scheduling. For example, in an exemplary aspect, the scheduled time slot can be equal to 1/performance counter frequency for the Windows operating system, and, therefore, a packet identifier can be scheduled for each such time slot, although slots may also be kept empty, indicating there is no data packet to be sent at that particular time. In this aspect, the exemplary system can provide an efficient way to convert high precision timestamps of the operating systems into those time slots.

Moreover, in an exemplary aspect, the shared schedule memory 320 can be a memory buffer that has a finite size, but mapping to an infinite ongoing schedule in that finite buffer is done through modulo arithmetic (i.e., the time slots "wrap around" upon reaching a certain value). Thus, the entry index in the schedule array 320 is the current time modulo for the length of the array. However, even though modulo arithmetic is used for the schedule array 320, this memory design should not cause any conflict for the time slots and packet identifiers as long the schedule array is long enough (e.g., using a memory array having a size that enables up to one second of schedule).

Thus, according to the exemplary aspect, the kernel module 250 (as a data packet transmission scheduler) will continuously poll the shared schedule memory 320 at the current system time to identify which packet identifier is associated with the next time slot (according to the system time) to determine the order of transmitting packets. In other words, the kernel module 250 continuously polls the shared schedule memory 320 for each time slot and identifies the corresponding packet identifier. Then, based on the packet identifier, the sending thread executed by the kernel module 250 will then read from either of shared packet memories 310A and 310B to access data packets 316A and 316B, respectively, based on which packet was scheduled as indicated in the shared schedule memory 320. In turn, the kernel module 250 can identify these data packets 316A and 316B based on their packet identifiers and then a data packet transmission controller as a sub-component of the kernel module 250 can pass them according to the scheduled time slot to NIC 260 to be transmitted as data streams (i.e., shown as data streams 318A and 318B) to network 400 and ultimately to the targeted one or more media consuming devices, for example.

It should be appreciated that the same timing scheme can be implemented with respect to the exemplary embodiment described above with respect to FIG. 2. That is, although not shown, control signals 312 can include time slot and corresponding packet identifiers for data packets 314 and order to coordinate the transmission thread (i.e., data stream 318).

As further shown, the kernel module 250 is shown to be communicatively coupled to user mode applications 120A and 120B. As a result, respective control signals 312A and 312B can be communicated between the devices as shown. For example, in response to a request from a user mode application 120A and 120B, the kernel module 250 can transmit a signal to each such applications indicating it is in a ready to transmit status and that it is polling shared schedule memory 320 for schedule data. Moreover, each user mode applications 120A and 120B can transmit control signals to kernel module 250 informing the kernel module 250 that there is no more data to be transmitted for that application. As a results, the sending thread (or either thread) can be stopped after the last applications stops using it.

According to the exemplary embodiment of FIG. 3A, by providing a single memory for the shared schedule memory for both user mode applications, the computing device 60 provides maximum performance since the kernel module 250 will only need to poll a single location to identify which packets to send and their corresponding time slots. However, in certain instances, using a single array for the shared schedule memory may lead to issues of security and fault tolerance as each user mode application will have access to the same shared schedule (i.e., shared schedule memory 320), and, therefore, a single misbehaved application could un-schedule (or de-prioritize) packets scheduled by another application.

Figure 3B:
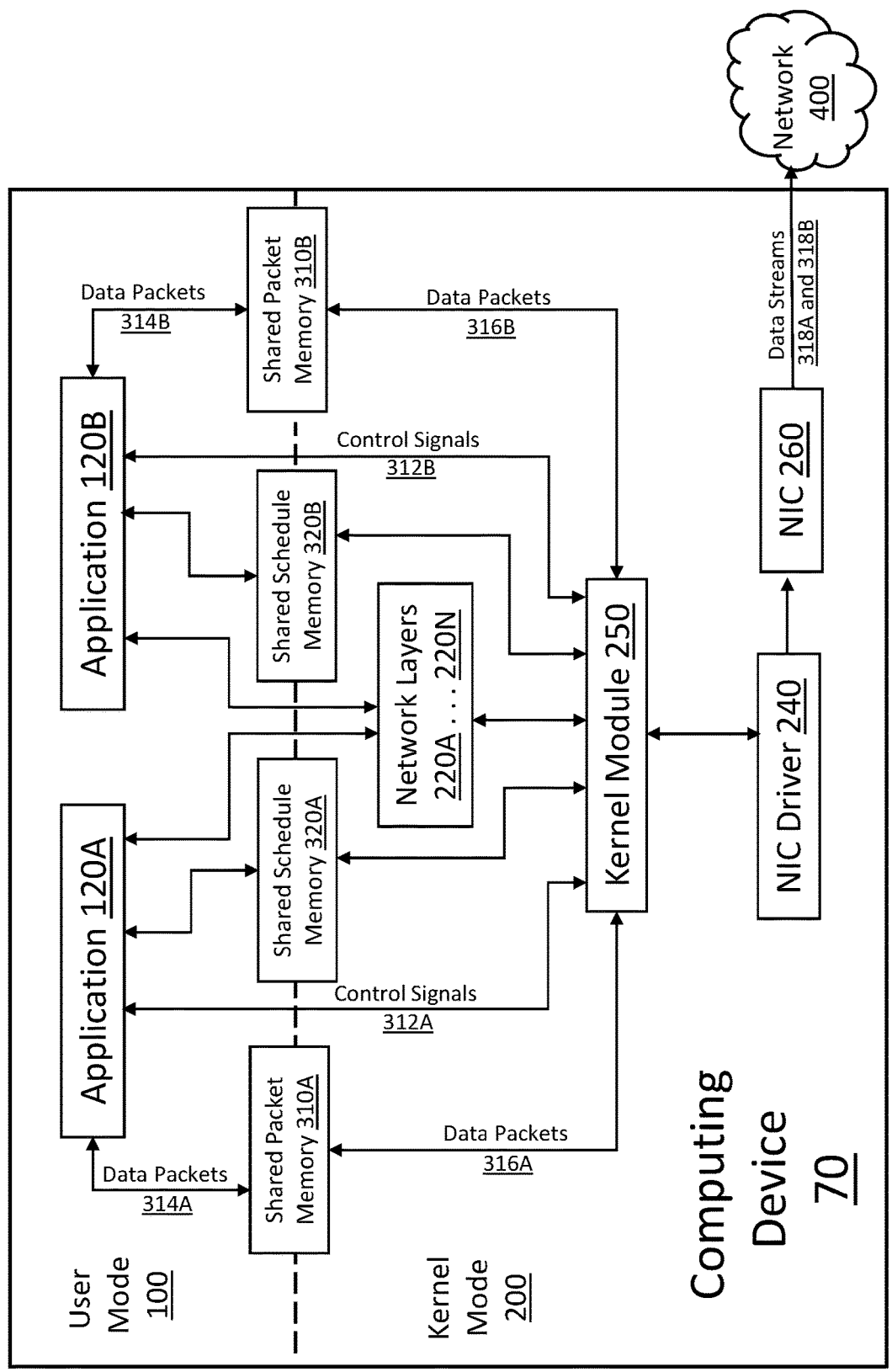
FIG. 3B illustrates a block diagram of a system for timely and uniform distribution real-time data packet transmission according to yet another exemplary aspect.

FIG. 3B illustrates a block diagram of a system for timely and uniform distribution real-time data packet transmission according to yet another exemplary aspect. As shown, computing device 70 includes many of the same components as described above with respect to computing device 60, and such components will not be described again. The main difference between the two embodiments is that instead of a single shared schedule memory 320, the computing device 70 provides a separate shared schedule memory 320A for application 120A and also shared schedule memory 320B for application 120B (collectively referred to as second shared memory buffers). As a result, each user mode application 120A and 120B can have its own schedule, which improves the security of the system as it is separately polled by the kernel module 250 and other user mode applications do not have access (and cannot maliciously de-prioritize the schedule, or the like). The tradeoff in this case is that separate shared schedule memories 320A and 320B must be separately accessed by the kernel module 250, which, in turn, requires additional processing to merge the different schedules together by the kernel module 250, as would be appreciated to one skilled in the art.

For either embodiment of computing device 60 (single schedule memory array) or computing device 70 (multiple schedule memory arrays), the sending thread of the kernel module 250 is configured to wait to send packets until at the right time (i.e., the scheduled time slot associated with the corresponding packet identifier). As will be described in detail below, this waiting period can be performed through a busy loop, since the sending device cannot rely solely only on the sleeping function of the operating system of the device since the disclosed methods can be applied non real-time operating systems.

Thus, according to a refinement of the exemplary embodiments described above, in one aspect, the kernel module 250 is configured to execute multiple threads concurrently by switching back and forth between threads. In particular, certain operating systems implement time limits on high priority threads so that they cannot run constantly/continuously without causing other operational issues. Thus, the kernel module 250 can be configured to use two or more threads running in alternation to circumvent this operational limit.

Figure 4:
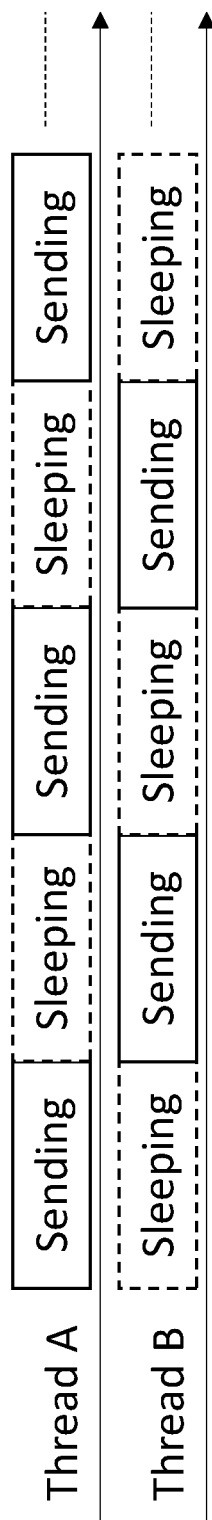
FIG. 4 illustrates a timing of the kernel module for executing multiple threads for timely and uniform distribution real-time data packet transmission according to yet another exemplary aspect.

FIG. 4 illustrates a timing of the kernel module for executing multiple threads for timely and uniform distribution real-time data packet transmission according to yet another exemplary aspect. As shown, a pair of threads A and B are shown that alternate between a sending state and a sleeping state. In other words the kernel module 250 operates as two threads where thread A sends data packets while thread B sleeps and then the threads alternate, such that thread A sleeps while and thread B sends packets, and so forth. It should be appreciated that kernel module 250 can use the alternating threads A and B to send data for a single user mode application (e.g., application 120B as shown in FIG. 2) or to send data for a plurality of user mode applications (e.g., applications 120A and 120B as shown in FIGS. 3A and 3B) while ensuring precise and timely transmission.

Importantly, each of threads A and B should run on its own processing core (although there can be two logical core of the same physical core), where both of the processing cores are reserved for the threads so that other system thread do not use them. Moreover, each thread should only stop the sending state and transition to the sleep state when that thread is sure that the other thread has woken up (i.e., entered the sending state), since non real-time operating system do not guarantee when a thread wakes up. Finally, each thread that enters a sending state must also be sure that the other thread is about to enter the sleeping state to avoid a case where both threads are sending packets at the same time. Exemplary algorithms for performing this switching between multiple threads will be described in more detail below. By using multiple threads, the kernel module 250 can effectively provide two processing cores that are used (i.e., in the sending state) +/−50% of the time and are in the idle sleeping state 50% of the time. Moreover, by running multiple threads, the kernel module 250 can circumvent any limits instituted by the operating system that prevent such a thread from constant/continuous execution by the CPU.

In general, it should be appreciated that setting the priority of the sending thread to the highest possible priority should be enough so that the kernel module does not get preempted (i.e., interrupted to execute another thread). However, since the kernel module 250 uses the two sending threads A and B that work one after the other, it is possible that the OS can schedule some other thread to run on the CPU core that was running the currently sleeping thread. Although this will likely not cause significant problems, because the two cores running the two sending thread might be two logical cores of the same physical core or due to CPU memory caching or some other low level hardware reason, it is possible that having other threads running during the sleeping period of the core used by sending thread can affect quality and performance of scheduling. Thus, as described above, in the exemplary embodiment, the kernel module 250 is preferably designed to monitor all the other threads running on the operating system and modify their affinity so that the other threads are never scheduled on the same processing core as the processing core dedicated for running the sending threads. Moreover, the Interrupt Service Routine (ISR) on the processing core designed for the sending threads are preferably reduced as much as possible as the ISR can also interrupt the sending thread. However, this is not as critical as the preventing interrupts of the other threads since ISRs have to be short (e.g., a few µs at most).

Figure 5:
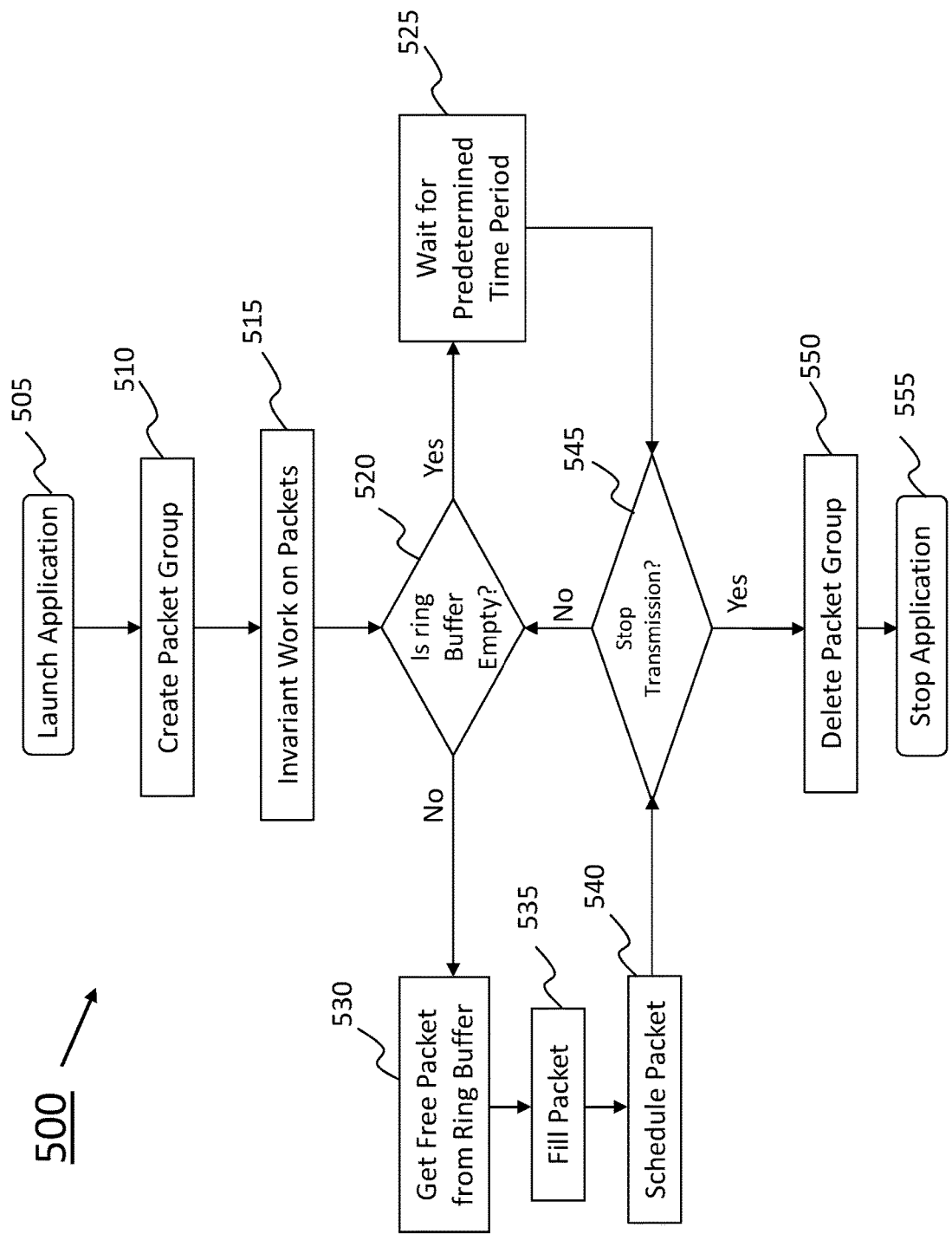
FIG. 5 illustrates a flowchart for a method for timely and uniform distribution real-time data packet transmission according to an exemplary aspect.

FIG. 5 illustrates a flowchart for a method for timely and uniform distribution real-time data packet transmission according to an exemplary aspect. In general, it is noted that the methods as described as follows refer to the components of the exemplary systems above. As shown, initially at step 505, one or more user mode applications is launched and begins generating data packets. The user mode applications may also send a request to the kernel module 250 to confirm that it is ready to execute the sending thread. Next, at step 510, the kernel module 250 operating in kernel mode 200 can create a packet group as described above. At this point, a control signal may be generated by kernel module 250 indicating to the user mode applications it is in a ready to transmit state. The algorithm then performs the kernel mode/user mode switch where the user mode application(s) begins preparing the data packets for transmission. Thus, as generally show, all steps performed in FIG. 5, except steps 510 and 550 are performed in user mode. Steps 510 and 550 are performed in kernel mode by the kernel module 250 that creates and deletes the packet group, respectively. Otherwise, the operating system transitions back to user mode where the user mode application performs the processing shown therein.

Specifically, at step 515, the user mode application performs invariant work on the data packets to prepare them for network transmission. For example, when all the packets are to be sent to the same destination, all Ethernet, IP and UDP headers can all be computed once by the application so that only the payload need to be updated as part of the "main loop". For example, generating the Ethernet header will require that the application convert the destination IP to a destination medium access control ("MAC") address, which can be a simple function for a multicast destination, for example, or it might require a network lookup using address resolution protocol ("ARP") in the case of a unicast destination on the same subnet.

Next, at step 520, the user mode application(s) will check the ring buffer (i.e., shared memory 310) to determine whether the ring buffer is empty. If it is empty, the user mode application will proceed to step 525 where it will wait a predetermined time period before checking the ring buffer again. For example, the time period may depend on the application need related to packet rate. Since sleep of the operating system is coarse compared to the speed at which the kernel module 250 can send data packets, the predetermined time period can simply be to sleep for the minimum amount of time possible by the OS in one example (e.g., 1 ms for Windows OS). In any event, as further shown, the method then proceeds to step 545 where the user mode application confirms whether to stop transmission of data packets. For example, during execution of the sending thread(s) of the kernel module 250, the user mode application(s) may determine that it is finished and has no more data packets to send. In this case, the user mode application can transmit a control signal back to the kernel module 250 to stop execution of the sending thread. If so, the user mode/kernel mode switch will be performed where the kernel mode 250 will then delete the packet group from the shared memory 310 before the application is stopped at step 555.

Assuming that the user mode application does not stop transmission at step 545, the method returns to step 520 where the user mode application(s) again checks the ring buffer to determine whether it is empty or contains a packet group. This loops is continued until the application determines that the ring buffer is not empty. For example, the ring buffer will be empty if the steps of preparing packets (i.e., steps 530 to 540, discussed below) are performed faster than the speed at which the packets are sent (and so the application can easily throttle its work based on the sending speed). In any event, the packets will be added back to the ring buffer at step 650 (discussed below) as soon as they are sent so that the user mode application knows the packet was sent and it can use the ring buffer to send additional packets. As further shown, when the ring buffer is not empty, the method proceeds to step 530 where the application gets a free data packet from the ring buffer (i.e., the shared memory 310), fills the packet (e.g., with the payload) at step 535 and schedules the packet for transmission at step 540 (and ultimately transmitted by NIC 260). The scheduling of each data packet will be described in more detail below with respect to FIGS. 7A and 7B. The filling of data packets, includes, adding the payload (and possibly completing or adjusting the headers for some part not performed as part of the invariant work), and will depend on what the application is transmitting and the protocols it is using. The method then returns to step 545 and then loop continues. As is shown, the user mode application continues to get free packets and schedule data packets for transmission until a stop transmission signal is detected at step 545. Advantageously, the disclosed algorithm minimizes the number of transitions between user mode and kernel mode, such that aside the creating of the packet group and the deleting of the packet group performed by the kernel module 250, the user mode application performs all other processing steps shown in FIG. 5 for the filling and scheduling of data packet transmission.

Figure 6:
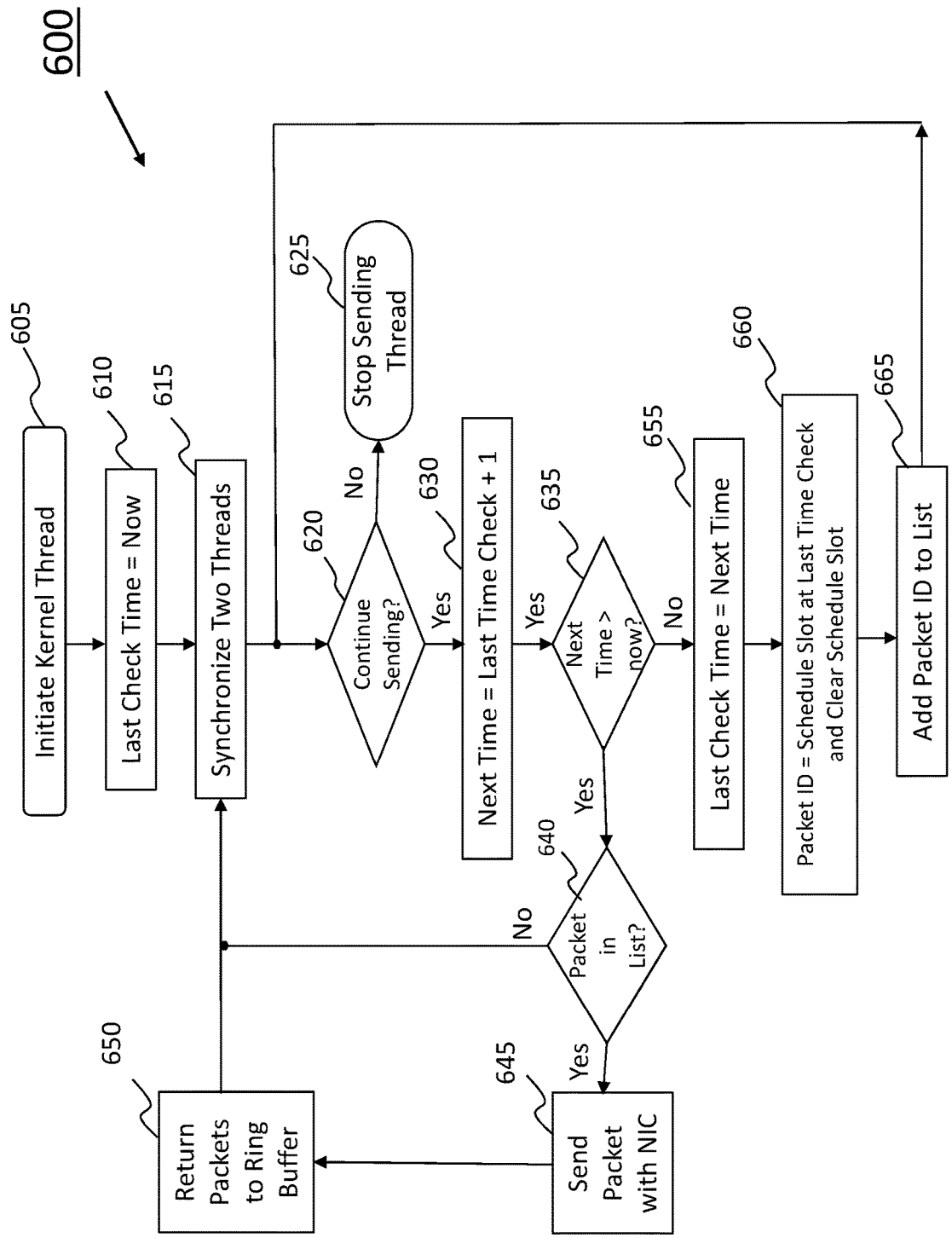
FIG. 6 illustrates a flowchart for a method for execution of the sending thread of the kernel module according to an exemplary aspect.

FIG. 6 illustrates a flowchart for execution of the sending thread of the kernel module according to an exemplary aspect. As shown, the kernel thread (i.e., the sending thread executed by kernel module 250) is launched at step 605. For example, according to the exemplary aspect, the kernel thread is created when the first application (e.g., user mode application 120A or 120B) start using the kernel module. The sending thread will continue to run by polling the schedule as long as there is an application running and transmitting data packets. As will be described below, step 620 will return a false (i.e., a "no") when there are no more applications using the kernel module for packet transmission. Next, at step 610, a system value for "last check time" (which can be a variable shared between the kernel mode 200 and user mode 100 and is a read only variable in the user mode 100) is set as the current time "now" (e.g., according to the system clock of the computing device). At step 615, the two or more threads (e.g., threads A and B) are synchronize as described above, that is, one thread is set to a sending state while the other thread is set to a sleeping state. The transition of these alternating states will be described in detail below.

Next, at step 620, the kernel module 250 checks to see if it should continue execution of the sending threads. In the exemplary aspect, step 620 will always return a "true" (i.e., a "yes") as long as at least one user mode application is using the kernel module 250 for packet transmission. Alternatively, in one aspect, the one or more user mode application(s) may in the interim transmit a control signal indicating that data packet transmission should be stopped. If the sending should be stopped (i.e., no more applications are transmitting data packets), the method will proceed to step 625 where the sending thread is terminated. Otherwise, the method will proceed to step 630 where a value for the "next time" is set as an increment of the "last time check" value plus one. The sending thread executed by the kernel module 250 will then check at step 635 whether the next time is greater than the current time. If so, the method proceeds to step 640 to determine whether there is a packet ID in a packet list (discussed below with respect to step 665) to be sent to the NIC driver 240 for scheduled transmission as a transmission control signal by the kernel module 205. If not, the method will proceed back to step 615. Otherwise, at step 645, the kernel module 250 will package the packets added to the list at step 665 and send them to the NIC driver 240 by pulling the data packet from the shared packet memory (e.g., ring buffer 310). The packet is then returned to the ring buffer after transmission at step 650 (so that the user mode application can fill it with new data and schedule it again in the future) and then the method returns to step 615 to continue the sending thread.

Alternatively, if, at step 635, the value for the "next time" was not greater than the current time value, then it is determined that the packet ID in schedule slot "next time" has to be sent. In these instances, the method proceeds to step 655 where the kernel module 655 sets the value for the "last check time" as the value for the "next time". At step 660, the kernel module 250 will identify the packet ID at the scheduled slot in the shared schedule memory (e.g., shared packet memory 320) where it will clear the schedule slot for the slot that corresponds to the "last check time". It is noted that at step 660, an interlocked function can be implemented to synchronize access to the variable (i.e., the value of the "last time check") that is shared by the multiple threads. Finally, at step 665, the packet identifier can then be added to the packet list. In other words, the packet ID(s) are added to the packet list that is sent by the NIC driver 240 at step 645. By accumulating packets in this list (as opposed to sending them one at the time as they are discovered), the kernel module 250 is effectively able to catch up when it discovers a packet may be late. As described in above, the kernel module 250 can operate more efficiently by sending multiple packets in one call to the NIC driver 240 at step 645 as opposed to multiple calls (one packet at the time) to the NIC driver 240. However, this will result in packets be sent in a burst, which is something the disclosed system is attempting to limit or avoid. Thus, preferably, the packet list sent to the NIC driver 240 will contain a single packet and it will only contain multiple packets when the packets are late on schedule. Finally, as shown, after the packet ID(s) is added to the list, the method returns to step 620 until the "next time" value is caught up with the current time so that packets in the list are sent (at step 645) or the sending thread is ultimately terminated at step 625, as discussed above.

As described above, the disclosed system and method are provided to run on a non-real-time operating system and since the NIC 260 and/or the NIC driver 240 may not be designed to be operated in real-time. Moreover, it is entirely possible that data packets are, for various reasons, no longer to be sent or the sending thread may be interrupted for some exceptional reason by the OS. According to the exemplary embodiments, the sending thread executed by the kernel module 250 can, in these cases, be designed to catch up on any potential backlog as quickly as possible. In general, most operating systems require that the NIC driver allows on being called with multiple data packets (instead of a single data packet) to reduce the calling overhead, and, since data packets are late anyway, the kernel module 250 can be configured to use that mechanism to send them back to back in a small burst in an effort to avoid unsent data and accumulating that lateness for the future. However, it should be appreciated that this small burst sending method will only be used by the kernel module 250 in exceptional cases where unexpected events happens or if the system is being pushed to the limit. In an alternative aspect, the kernel module 250 may conclude that the specific data packet was too late and will not schedule the packet for transmission and move on to the next data packets, but this will be a tradeoff between all packets being sent and schedule accuracy that can be determined by the specific system designer, for example.

Figure 7A:
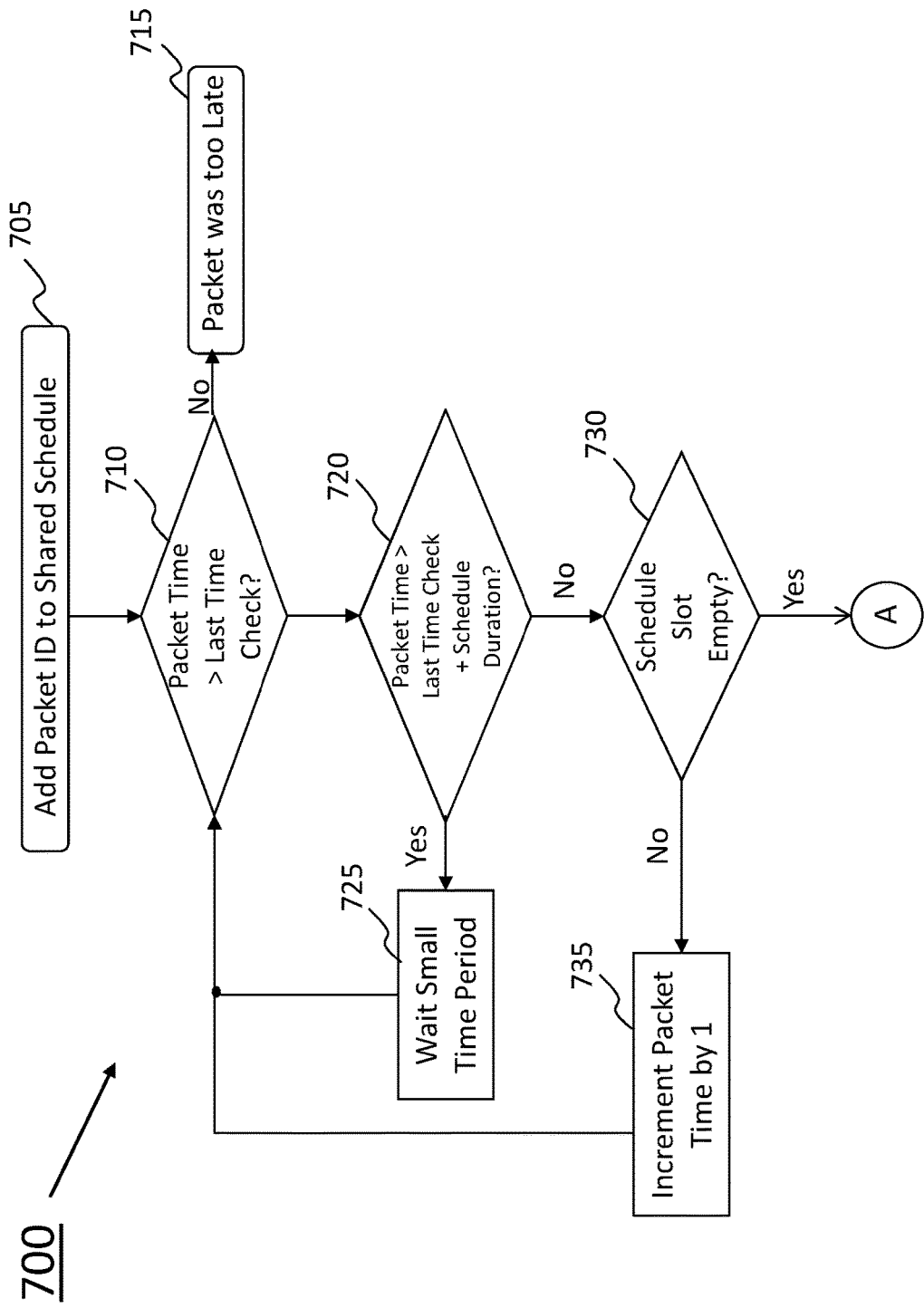
FIGS. 7A and 7B illustrate a flowchart for a method for scheduling data packets for timely and uniform transmission according to an exemplary aspect.
Figure 7B:
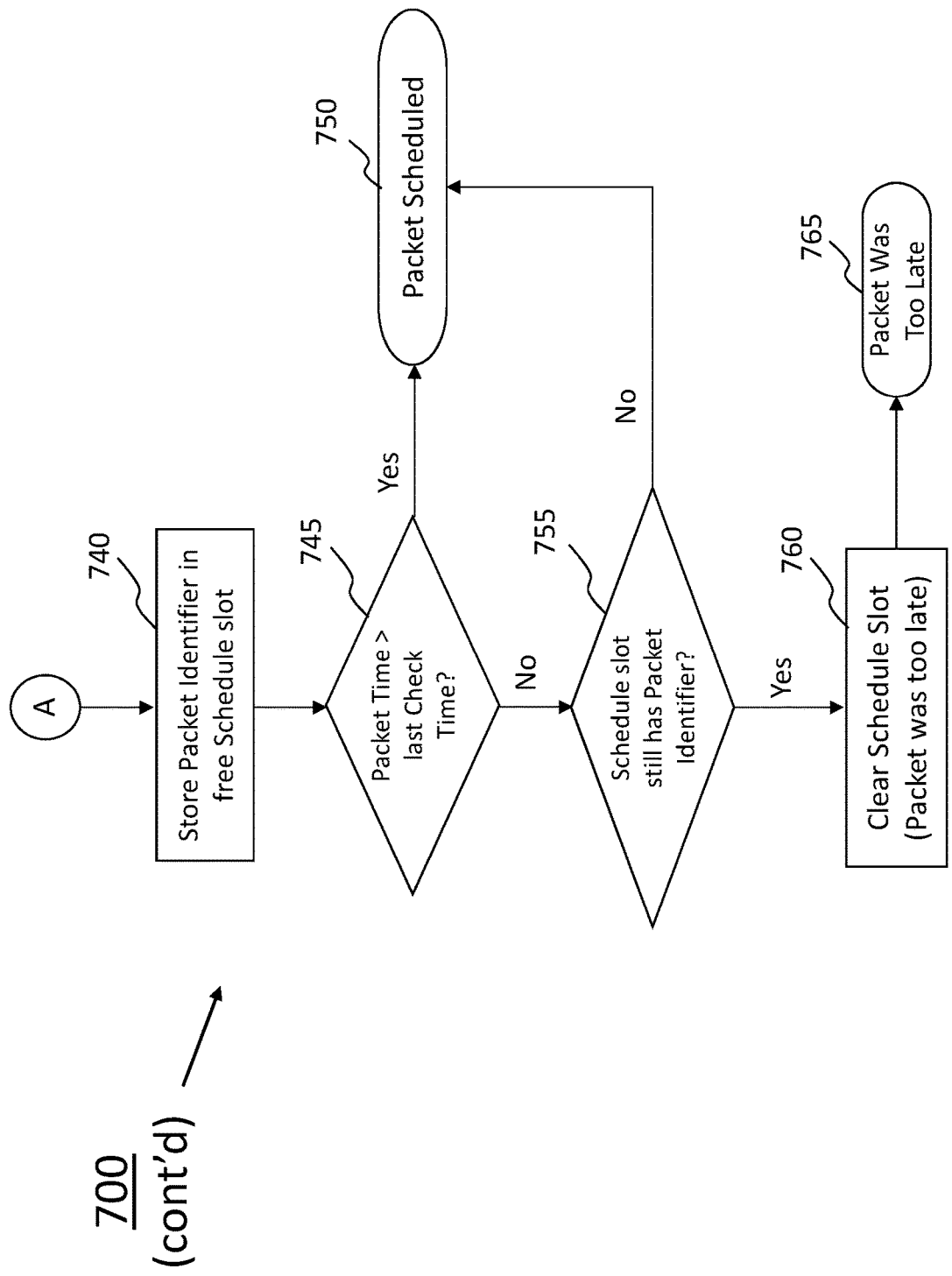

FIGS. 7A and 7B illustrate a flowchart for a method for scheduling data packets for timely and uniform transmission according to an exemplary aspect. In general, the algorithm shown can correspond to the scheduling of packets generally noted above with respect to step 540 of FIG. 5. As shown, initially at step 705, packet IDs will be added by the user mode application(s) to the shared schedule memory 320. As described above, each data packet has a unique packet identifier ("ID") that can be generated by combining the packet group identifier with the packet index within that group. At step 710, the user mode application (e.g., application 120A or 120B) confirms whether the packet time associated with the packet identifier (accessed from the shared schedule memory 320) is greater than the last time check. If it's not, then the user mode application knows that the corresponding data packet is too late (step 715) at which point the packet is either discarded or the system tries to schedule the packet again at some later time depending on the needs of data it is sending.

Otherwise, the method will proceed to step 720 where the user mode application will check whether the scheduled packet time is greater than the value of the "last time check" plus the schedule duration (i.e., the length of the time slot). If so, then the user mode application will know that the data packet is scheduled for too far in the future and will proceed to step 725 where it will wait a small predetermined period of time before returning to step 710. Otherwise, the user mode application will proceed to step 730 to determine whether the scheduled time slot (i.e., in shared schedule memory array 320) is empty or has a packet identifier. If it is not empty, the method proceeds to step 735, increments the packet time by 1 (i.e., the time duration of one time slot) and returns to step 710 to begin the scheduling process again.

However, if at step 730, the user mode application determines that the schedule slot in the shared schedule memory 320 is empty, the user mode application will proceed to step 740 where the packet identifier for the particular data packet is stored in the free schedule time slot (which can subsequently be polled by the kernel module 250) as described above. The user mode application will then confirm at step 745 that the packet time for the data packet is still greater than the value of the "last time check". If it is, then the packet is confirmed to be scheduled in the shared schedule memory 320 at step 750, which was performed by adding the packet ID for the particular data packet in the corresponding time slot at step 740. Otherwise, the method will proceed to step 755 to determine if the current schedule slot still has a packet identifier (meaning it has not been sent quite yet). If not, then the user mode application knows that the data packet it scheduled was not too late and confirms (i.e., a return value) that the data packet was scheduled on time at step 750. Otherwise, if the current schedule time slot still has a packet identifier at step 755, then the method proceeds to step 760 and clears the schedule slot as the packet it is attempting to schedule has been determined to be too late at step 765, in which case point the packet is either discarded or try schedule the packet again at some later time depending on the needs of data it is sending. It is noted that the process shown in FIGS. 7A and 7B can be continually performed continuously for the scheduling of data packets as the user mode application is generating a media stream to be transmitted using the sending thread of the kernel module 250 and the exemplary systems and algorithms described above.

It is noted that according to an exemplary aspect, the combined steps of read and write of packet identifiers need to be interlocked, i.e., the combination of steps 730 and 740 and the combination of steps 755 and 760 should be interlocked. In general, interlocked operations are lightweight CPU mechanisms that guarantee that only one application can perform a group of read and write at a given place in memory. In the exemplary embodiment, only the user mode application (or only one of the user mode applications if there is multiple) or the kernel module will be able to read and write that precise memory slot in the schedule.

Figure 8:
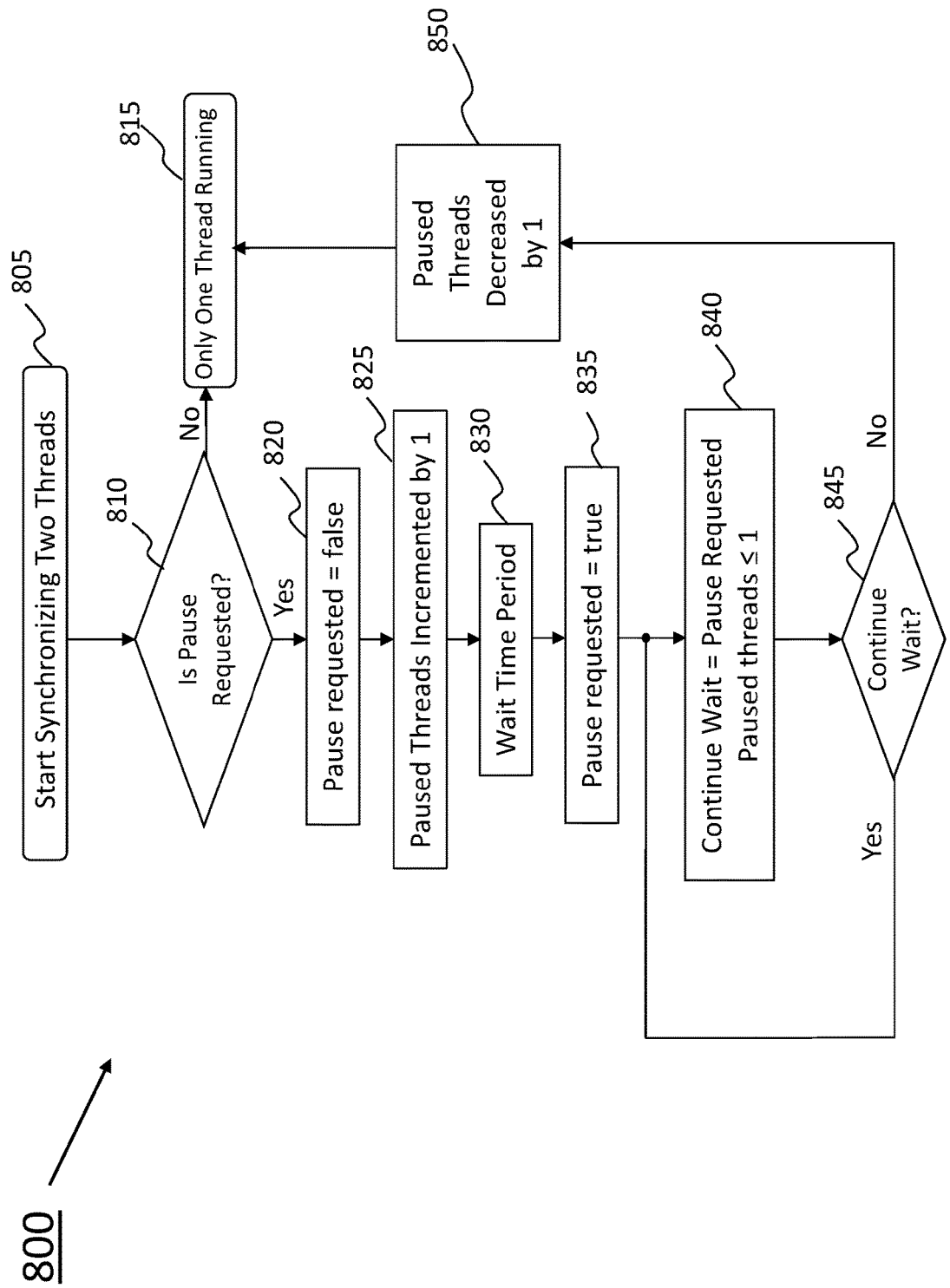
FIG. 8 illustrates a flowchart for a method for synchronizing a plurality of threads to perform shared timely and uniform distribution real-time data packet transmission according to an exemplary aspect.

FIG. 8 illustrates a flowchart for a method for synchronizing a plurality of threads to perform shared timely and uniform distribution real-time data packet transmission according to an exemplary aspect. For example, the exemplary method can be performed by kernel module 250 executing a pair of threads, such as threads A and B as shown in FIG. 4 and described above. Moreover, it is noted that the algorithm shown in FIG. 8 can be executed for each thread running and indicates when it should transition from the sleep state to the sending state and vice versa.

As shown, initially, at step 805, the kernel module 250 begins the process of synchronizing the two threads (e.g., threads A and B), for example, by polling the shared schedule memory 320 for the packet identifiers and accessing the shared packet memories 310A and 310B for respective data packet 316A and 316B. Next, at step 810, a first thread (e.g., thread A) will check to determine whether a pause has been requested (e.g., generated by the other thread B). If not, then thread A will assume it's the only thread running at step 815 can continue transmitting data packets. Otherwise, if a pause has been requested by the other thread, the method will proceed to step 820 where the running thread will temporarily set the value "pause requested" to false. In the exemplary aspect, steps 810 and 820 will be interlocked.

Furthermore, at step 825, the number of threads will be incremented by 1 at step 825 and then the method will wait for a small time period at step 830, before the value of the "pause requested" variable, which is shared for both threads, will be set to "true". It is noted that because the "pause requested" variable is shared between threads, the incrementing step 825, and also the decrementing step 850 (discussed below), will need to be an interlocked/atomic operation. After the "pause requested" variable is set to "true", the thread A will be in the sleeping state and will generate a request for thread (e.g., thread B which is currently transmitted packets) to enter the pause state. Then, the thread A will enter a continuous loop at step 840 where a value for "continue wait" will be set to the value of "pause requested", which as noted above is set to true, and confirm that the number of paused threads is less than or equal to 1 (i.e., if the number is greater than 1 then the kernel module 250 will know that both threads are in the paused/sleeping state and that the threads are not correctly alternating between the two states).

At step 845, the paused thread A will confirm that it should continue to wait (i.e., remain in sleep state) and return to step 840, at which point this loop will continue until the thread B enters the pause state. Once the thread A is no longer in the wait state at step 845 (e.g., by receiving a signal from thread B that it has entered the pause state), the method proceeds to step 850 where thread A enters the sending state and the number of paused threads is decreased by 1. Thread A then assumes it's the only thread running at step 815 and continues the sending process until another pause is requested at step 810. Accordingly, each sending thread in the system (e.g., sending threads A and B executed by the kernel module 250) can perform the algorithm disclosed in FIG. 8 and continue to switch between the sleeping state and the sending state as shown in FIG. 4.

FIG. 9 illustrates a high-level block diagram of a system for timely and uniform distribution real-time data packet transmission according to an exemplary aspect. As shown, the system 900 includes various hardware components and other features, for use in accordance with aspects presented herein. Aspects presented herein may be implemented using hardware, software, or a combination thereof and may be implemented in one or more computer systems or other processing systems. Thus, according to an exemplary embodiment, system 900 may also include one or more processors, such as processor 902, that is connected to a communication interface 906 (e.g., a communications bus, cross-over bar, or network). Moreover, the communication interface is connected to the network interface controller 260 controlled by the NIC driver 240, which is configured to transmitted data packets to media consuming devices via network 400, as described above.

Moreover, by way of example, an element, or any portion of an element, or any combination of elements may be implemented with a "processing system" that includes one or more processors. The processing system further includes one or more modules (including kernel module 250) for executing the algorithms described herein. The modules may be software modules running in the processor 902, resident/stored in memory 908, e.g., a computer readable medium, one or more hardware modules coupled to the processor 902, or some combination thereof. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Computer system 900 also includes a main memory 904, preferably random access memory (RAM), and may also include a secondary memory 908. The secondary memory 908 may include, for example, a hard disk drive 910 and/or a removable storage drive 912, representing a floppy disk drive, a magnetic tape drive, an optical disk drive, etc. The removable storage drive 912 reads from and/or writes to a removable storage unit 916 in a well-known manner. Removable storage unit 916, represents a floppy disk, magnetic tape, optical disk, etc., which is read by and written to removable storage drive 912. As will be appreciated, the removable storage unit 916 includes a computer usable storage medium having stored therein computer software and/or data.

In alternative implementations, secondary memory 908 may include other similar devices for allowing computer programs or other instructions to be loaded into computer system 900. Examples of such may include a program cartridge and cartridge interface (such as that found in video game devices), a removable memory chip (such as an erasable programmable read only memory (EPROM), or programmable read only memory (PROM)) and associated socket, which allow software and data to be transferred from the removable storage unit 908 to computer system 900. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

Computer programs (also referred to as computer control logic) are stored in main memory 904 and/or secondary memory 908. Such computer programs, when executed, enable the computer system 900 to perform the features and algorithms of the exemplary aspects discussed herein. In particular, the computer programs, when executed, enable the processor 902 to perform the features of the presented herein. Accordingly, such computer programs represent controllers of the computer system 900.

If implemented in software, the functions may be stored on or encoded as one or more instructions or code on a computer-readable medium. Computer-readable media includes computer storage media. Thus, when aspects are the implemented using software, the software may be stored in a computer program product and loaded into computer system 900 using removable storage drive 912, or hard drive 910, for example. The control logic (software), when executed by the processor 902, causes the processor 902 to perform the functions as described herein. In another example implementation, aspects may be implemented primarily in hardware using, for example, hardware components, such as application specific integrated circuits (ASICs). Implementation of the hardware state machine so as to perform the functions described herein will be apparent to persons skilled in the relevant art(s).

Aspects may also be implemented using a combination of both hardware and software. Accordingly, in one or more example aspects, the functions described may be implemented in hardware, software, firmware, or any combination thereof.

While aspects have been described in conjunction with the example implementations outlined above, various alternatives, modifications, variations, improvements, and/or substantial equivalents, whether known or that are or may be presently unforeseen, may become apparent to those having at least ordinary skill in the art. Accordingly, the example implementations of the invention, as set forth above, are intended to be illustrative, not limiting. Various changes may be made without departing from the spirit and scope of the aspects. Therefore, the aspects are intended to embrace all known or later-developed alternatives, modifications, variations, improvements, and/or substantial equivalents.

Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed:

1. A system for data packet transmission by a computing device, the system comprising:
   a data packet memory buffer configured to store a plurality of data packets respectively generated by a plurality of software applications operating in a user mode of an operating system of the computing device;
   a time slot memory buffer configured to store a plurality of time slots for scheduling a timing of the data packet transmission of the plurality of data packets;
   a kernel module operating in a kernel mode of the operating system of the computing device and configured to execute a plurality of alternating threads for transmitting the plurality of data packets for each of the plurality of software applications;

wherein each of the plurality of software applications is coupled to the data packet memory buffer that stores the plurality of data packets for the plurality of software applications;

wherein the kernel module is further configured to poll the time slot memory buffer to access a plurality of packet identifiers associated with the plurality of data packets generated by the plurality of software applications;

wherein the plurality of packet identifiers are associated with the plurality of time slots for the data packet transmission, respectively;

wherein the kernel module is further configured to access each of the plurality of data packets from the data packet memory buffer based on the respective packet identifier and corresponding time slot;

wherein each of the plurality of alternating threads is configured to transition from a sending state to a sleeping state upon determining that the other thread of the plurality of alternating threads has transitioned from the sleeping state to the sending state, such that the kernel module is configured to circumvent at least one operational limit required by the operating system of the computing device to prevent continuous thread execution by a processor of the computing device;

wherein the kernel module is configured to directly access the plurality of data packets from the data packet memory buffer by bypassing a transition through a network stack in the kernel mode of the operating system before network transmission; and wherein each of the data packet memory buffer and the time slot memory buffer are shared between the user mode and the kernel mode of the operating system of the computing device.

2. The system according to claim 1, wherein the data packet memory buffer comprises a first data packet memory buffer configured to store respective data packets of a first software application of the plurality of applications and a second data packet memory buffer configured to store respective data packets of a second software application of the plurality of applications, and wherein the time slot memory buffer comprises a first time slot memory buffer configured to store respective time slots for scheduling the timing of the data packet transmission of the first software application and a second time slot memory buffer configured to store respective time slots for scheduling the timing of the data packet transmission of the second software application.

3. The system according to claim 1, wherein the kernel module comprises:

a packet group generator configured to generate a packet group for the data packet memory buffer; and a data packet transmission scheduler configured to poll the time slot memory buffer to access the plurality of packet identifiers associated with the plurality of data packets generated by the plurality of software applications.

4. The system according to claim 3, wherein the kernel module further comprises a data packet transmission controller coupled to a driver of a network interface controller and configured to control the driver to transmit each of the plurality of data packets via the network interface controller over the network based on the corresponding time slot.

5. The system according to claim 4, wherein the kernel module is further configured to send a packet list to the driver of the network interface controller that includes two or more data packets of the plurality of data packets when the kernel module determines that at least one data packet of the two more data packets included in the packet list is late on schedule according to the corresponding time slot in the time memory buffer.

6. A system for data packet transmission by a computing device, the system comprising:

a data packet memory buffer configured to store a plurality of data packets respectively generated by a pair of software applications operating in a user mode of an operating system of the computing device;

a time slot memory buffer configured to store a plurality of time slots for scheduling a timing of the data packet transmission of the plurality of data packets;

a kernel module operating in a kernel mode of the operating system of the computing device and configured to execute a pair of alternating threads for transmitting the plurality of data packets for each of the pair of software applications, respectively;

wherein each of the pair of software applications is coupled to the data packet memory buffer that stores the plurality of data packets for the pair of software applications;

wherein the kernel module is further configured to access each of the plurality of data packets from the data packet memory buffer based on a respective packet identifier for each data packet;

wherein each of the pair of alternating threads is configured to transition from a sending state to a sleeping state upon determining that the other thread of the pair of alternating threads has transitioned from the sleeping state to the sending state, such that the kernel module is configured to circumvent at least one operational limit required by the operating system of the computing device to prevent continuous thread execution by a processor of the computing device; and wherein the kernel module is configured to directly access the plurality of data packets from the data packet memory buffer by bypassing a transition through a network stack in the kernel mode of the operating system before network transmission.

7. The system according to claim 6, wherein each of the data packet memory buffer and the time slot memory buffer are shared between the user mode and the kernel mode of the operating system of the computing device.

8. The system according to claim 6, wherein the kernel module is further configured to poll the time slot memory buffer to access the plurality of packet identifiers associated with the plurality of data packets generated by the pair of software applications, with the plurality of packet identifiers being associated with the plurality of time slots for the data packet transmission, respectively.

9. The system according to claim 6, wherein the data packet memory buffer comprises a first data packet memory buffer configured to store respective data packets of a first software application of the pair of applications and a second data packet memory buffer configured to store respective data packets of a second software application of the pair of applications, and wherein the time slot memory buffer comprises a first time slot memory buffer configured to store respective time slots for scheduling the timing of the data packet transmission of the first software application and a second time slot memory buffer configured to store respective time slots for scheduling the timing of the data packet transmission of the second software application.

10. The system according to claim 6, wherein the kernel module comprises:
a packet group generator configured to generate a packet group for the data packet memory buffer; and
a data packet transmission scheduler configured to poll the time slot memory buffer to access the plurality of packet identifiers associated with the plurality of data packets generated by the pair of software applications.

11. The system according to claim 10, wherein the kernel module further comprises a data packet transmission controller coupled to a driver of a network interface controller and configured to control the driver to transmit each of the plurality of data packets via the network interface controller over the network based on the corresponding time slot of the plurality of time slots.

12. The system according to claim 11, wherein the kernel module is further configured to send a packet list to the driver of the network interface controller that includes two or more data packets of the plurality of data packets when the kernel module determines that at least one data packet of the two more data packets included in the packet list is late on schedule according to the corresponding time slot in the time memory buffer.

13. A system for data packet transmission by a computing device, the system comprising:
a data packet memory buffer configured to store a plurality of data packets generated by a pair of software applications, respectively, operating in a user mode of an operating system of the computing device;
a kernel module operating in a kernel mode of the operating system of the computing device and configured to execute a pair of alternating threads for transmitting the plurality of data packets for each of the pair of software applications, respectively;
wherein each of the pair of alternating threads is configured to transition from a sending state to a sleeping state upon determining that the other thread of the pair of alternating threads has transitioned from the sleeping state to the sending state, such that the kernel module is configured to circumvent at least one operational limit required by the operating system of the computing device to prevent continuous thread execution by a processor of the computing device.

14. The system according to claim 13, wherein the kernel module is configured to directly access the plurality of data packets from the data packet memory buffer by bypassing a transition through a network stack in the kernel mode of the operating system before network transmission.

15. The system according to claim 14, further comprising:
a time slot memory buffer configured to store a plurality of time slots for scheduling a timing of the data packet transmission of the plurality of data packets; and
wherein the kernel module is further configured to poll the time slot memory buffer to access a plurality of packet identifiers associated with the plurality of data packets generated by the pair of software applications, with the plurality of packet identifiers being associated with the plurality of time slots for the data packet transmission, respectively.

16. The system according to claim 15, wherein the kernel module comprises:
a packet group generator configured to generate a packet group for the data packet memory buffer; and
a data packet transmission scheduler configured to poll the time slot memory buffer to access the plurality of packet identifiers associated with the plurality of data packets generated by the pair of software applications.

17. The system according to claim 15,
wherein the data packet memory buffer comprises a first data packet memory buffer configured to store respective data packets of a first software application of the pair of applications and a second data packet memory buffer configured to store respective data packets of a second software application of the pair of applications, and
wherein the time slot memory buffer comprises a first time slot memory buffer configured to store respective time slots for scheduling the timing of the data packet transmission of the first software application and a second time slot memory buffer configured to store respective time slots for scheduling the timing of the data packet transmission of the second software application.

18. The system according to claim 15, wherein the kernel module further comprises a data packet transmission controller coupled to a driver of a network interface controller and configured to control the driver to transmit each of the plurality of data packets via the network interface controller over the network based on the corresponding time slot of the plurality of time slots.

19. The system according to claim 18, wherein the kernel module is further configured to send a packet list to the driver of the network interface controller that includes two or more data packets of the plurality of data packets when the kernel module determines that at least one data packet of the two more data packets included in the packet list is late on schedule according to the corresponding time slot in the time memory buffer.

20. The system according to claim 13, wherein each of the data packet memory buffer and the time slot memory buffer are shared between the user mode and the kernel mode of the operating system of the computing device.

* * * * *